(12) United States Patent
Saito et al.

(10) Patent No.: US 6,524,678 B2
(45) Date of Patent: Feb. 25, 2003

(54) INFORMATION RECORDING MEDIUM AND RECORDING METHOD

(75) Inventors: Naoki Saito, Kanagawa (JP); Yoshihisa Usami, Kanagawa (JP); Noboru Komori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/784,047

(22) Filed: Feb. 16, 2001

(65) Prior Publication Data

US 2002/0006494 A1 Jan. 17, 2002

(30) Foreign Application Priority Data

Feb. 16, 2000 (JP) ........................................ 2000-038513

(51) Int. Cl.$^7$ ................................................. B32B 3/02
(52) U.S. Cl. ................. 428/64.1; 428/64.8; 430/270.18
(58) Field of Search ............................... 428/64.1, 64.4, 428/64.8, 913; 438/270.18, 495.1, 945; 369/283, 288

(56) References Cited

U.S. PATENT DOCUMENTS

| 4,885,228 A | | 12/1989 | Inagaki et al. | |
|---|---|---|---|---|
| 4,968,593 A | | 11/1990 | Inagaki et al. | |
| 5,182,186 A | * | 1/1993 | Inagaki ........................ | 430/270 |
| 5,227,495 A | * | 7/1993 | Inagaki .................... | 548/302.1 |

FOREIGN PATENT DOCUMENTS

| EP | 0 310 059 | 4/1989 |
|---|---|---|
| JP | A-4-74690 | 3/1992 |
| JP | A-5-38878 | 2/1993 |
| JP | A-6-40161 | 2/1994 |
| JP | A-11-53758 | 2/1999 |
| JP | A-2000-108513 | 4/2000 |
| JP | A-2000-263938 | 9/2000 |

OTHER PUBLICATIONS

XP–002179328—Abstract (Sep. 28, 1993).
XP–002179329—Abstract (Jun. 23, 1998).
Patent Abstracts of Japan—01242287 (Sep. 27, 1989).
European Search Report dated Oct. 17, 2001.

* cited by examiner

*Primary Examiner*—Elizabeth Mulvaney
(74) *Attorney, Agent, or Firm*—Sughrue Mion, PLLC

(57) ABSTRACT

An optical information recording medium comprising a substrate having thereon a recording layer capable of information recording by laser irradiation, wherein said recording layer contains a dye compound represented by the following formula (I), (II) or (III):

$$R^{11}R^{12}N^{+}\!=\!L^{11}\!-\!L^{12}\!=\!L^{13}\!-\!NHR^{13}\cdot(1/m)(X^{1})^{m-} \quad (I)$$

$$R^{21}R^{22}N\!-\!L^{21}\!=\!L^{22}\!-\!L^{23}\!=\!NR^{23} \quad (II)$$

$$R^{31}R^{32}N^{+}\!=\!L^{32}\!=\!L^{33}\!-\!NR^{33}R^{34}\cdot(1/n)(X^{3})^{n-} \quad (III)$$

The meanings of the symbols are defined and explained in the specification. Also discussed is a method for recording information using the optical information recording medium.

12 Claims, No Drawings

INFORMATION RECORDING MEDIUM AND RECORDING METHOD

FIELD OF THE INVENTION

The present invention relates to an optical information recording medium capable of recording and reproducing information using a laser and also to a method for recording information. More specifically, the present invention relates to a heat mode-type optical information recording medium suitable for the recording of information using a short wavelength laser at a wavelength of 550 nm or less, such as recordable optical disk (CD-R) and digital video disk (DVD-R).

BACKGROUND OF THE INVENTION

Conventionally, an optical information recording medium (optical disk) capable of only once recording information by a laser is known. This optical disk is called CD recordable (so-called CD-R) and in a representative structure thereof, a recording layer comprising an organic disk, a light-reflecting layer comprising a metal such as gold, and a resin-made protective layer are provided in a stacked layer state on a transparent disk-like substrate. The recording of information on this CD-R is performed by irradiating a laser in the near infrared region (usually a laser at a wavelength in the vicinity of 780 nm) on the CD-R. The irradiated portion of the recording layer absorbs light and causes local elevation of the temperature, as a result, physical or chemical changes (for example, production of pits) are generated and the optical properties thereof are changed, thereby recording the information. On the other hand, the reading (reproduction) of information is also performed by irradiating a laser at the same wavelength as the laser for recording, and while detecting the difference in the reflectance between the portion changed in the optical properties (recorded portion) and the portion not changed (unrecorded portion) of the recording layer, the information is reproduced.

In recent years, an optical information recording medium having a higher recording density is being demanded. To cope with this requirement, an optical disk called recordable digital video disk (so-called DVD-R) has been proposed (see, Nikkei New Media, extra number "DVD", issued in 1995). This DVD-R has a structure such that two sheets of disks each obtained by providing a recording layer comprising a dye on a transparent disk-like substrate having formed thereon a guide groove (pregroove) for tracking of the irradiated laser to a width as narrow as a half or less (0.74 to 0.8 μm) as compared with CD-R and usually on the recording layer, providing a light-reflecting layer and if desired, further a protective layer, or the disk and a disk-like protective substrate having the same shape as the disk, are laminated with an adhesive while disposing said recording layer in the inner side. The recording and reproduction of information in the DVD-R is performed by irradiating a visible laser (usually a laser at the wavelength of 630 to 680 nm), where higher density recording than in CD-R can be achieved.

Also in recent years, networks such as internet, and high-vision TV are abruptly propagating and to cope with this tendency, demands for a high-capacity recording medium capable of inexpensively and easily recording the image information are increasing. The DVD-R can ensure the position as a large-capacity recording medium to a certain extent but cannot be said to have a recording capacity highly enough to be responsible to the requirements in the future. Therefore, studies are proceeding to develop an optical disk having a larger recording capacity by using a laser having a further shorter wavelength than DVD-R and thereby improving the recording density. For example, JP-A-4-74690 (the term "JP-A" as used herein means an "unexamined published Japanese patent application"), JP-A-5-38878, JP-A-6-40161, JP-A-11-53758, JP-A-2000-108513 and JP-A-2000-263938 disclose an optical information recording medium using an organic dye as the recording dye, such as monomethine cyanine dye, styryl-base dye, metal azo-base dye, quinophthalone-base dye and trimethine cyanine dye, and a recording/reproducing method for recording and reproducing information by irradiating a laser having a wavelength of 550 nm or less on this optical information recording medium.

SUMMARY OF THE INVENTION

According to the studies made by the present inventors, it has been found that the optical disk described in JP-A-11-53758 is not yet satisfied in the sensitivity in practice and in the recording properties such as reflectance and modulation factor and still in need of improvement.

An object of the present invention is to provide an information recording medium capable of recording/reproducing information by a laser having a shorter wavelength than those used for CD-R or DVD-R, particularly a laser having a wavelength of 550 nm or less, and at the same time, exhibiting excellent recording properties.

Another object of the present invention is to provide an information recording method capable of performing high-density recording of information by using an optical information recording medium in which a recording layer containing a dye compound having high sensitivity to a laser is provided.

Other objects and effects of the present invention will become apparent from the following description.

As a result of investigations, the present inventors have found that when a dye compound represented by formula (I), (II) or (III) is used as the recording material of the recording layer, an optical information recording medium capable of exhibiting high sensitivity even to a laser having a short wavelength of 550 nm or less, and favored with good recording/reproducing properties of giving high reflectance and high modulation factor can be produced.

The present invention also relates to an information recording method of recording information by irradiating a laser having a wavelength of 550 nm or less on the above-described information recording medium.

That is, the above-described objects of the present invention have been achieved by providing the following optical information recording media and information recording method.

(1) An optical information recording medium comprising a substrate having thereon a recording layer capable of information recording by laser irradiation, wherein said recording layer contains a dye compound represented by the following formula (I), (II) or (III):

wherein $R^{11}$, $R^{12}$ and $R^{13}$ each independently represents an alkyl group, an aryl group, an aralkyl group or a heterocyclic group, $L^{11}$, $L^{12}$ and $L^{13}$ each independently represents a methine group which may have a substituent, $(X^1)^{m-}$ represents an organic or inorganic m-valent anion, m represents an integer of 1 to 5, and any two of $R^{11}$, $R^{12}$, $R^{13}$, $L^{11}$, $L^{12}$ and $L^{13}$ may combine to form a ring;

$$R^{21}R^{22}N\!-\!L^{21}\!=\!L^{22}\!-\!L^{23}\!=\!NR^{23} \quad\quad (II)$$

wherein $R^{21}$, $R^{22}$ and $R^{23}$ each independently represents an alkyl group, an aryl group, an aralkyl group or a heterocyclic group, $L^{21}$, $L^{22}$ and $L^{23}$ each independently represents a methine group which may have a substituent, and any two of $R^{21}$, $R^{22}$, $R^{23}$, $L^{21}$, $L^{22}$ and $L^{23}$ may combine to form a ring;

$$R^{31}R^{32}N^{+}\!=\!L^{31}\!-\!L^{32}\!=\!L^{33}\!-\!NR^{33}R^{34}\!\cdot\!(1/n)(X^{3})^{n-} \quad (III)$$

wherein $R^{31}$ and $R^{32}$ each independently represents an alkyl group, an aryl group, an aralkyl group or a heterocyclic group, $R^{33}$ and $R^{34}$ each independently represents an alkyl group, an aralkyl group or a heterocyclic group, $L^{31}$, $L^{32}$ and $L^{33}$ each independently represents a methine group which may have a substituent, $(X^{3})^{n-}$ represents an organic or inorganic n-valent anion, n represents an integer of 1 to 5, and any two of $R^{31}$, $R^{32}$, $R^{33}$, $R^{34}$, $L^{31}$, $L^{32}$ and $L^{33}$ may combine to form a ring.

(2) The optical information recording medium according to item (1) above, wherein $R^{11}$, $R^{12}$, $R^{13}$, $R^{21}$, $R^{22}$, $R^{23}$, $R^{31}$ and $R^{32}$ in formulae (I), (II) and (III) each independently represents an alkyl group having from 1 to 20 carbon atoms, which may have a substituent, an aryl group having from 6 to 18 carbon atoms, which may have a substituent, an aralkyl group having from 7 to 18 carbon atoms, which may have a substituent, or a 5- or 6-membered heterocyclic group which may have a substituent, and $R^{33}$ and $R^{34}$ in formula (III) each independently represents an alkyl group having from 1 to 20 carbon atoms, an aralkyl group having from 7 to 18 carbon atoms, or a 5- or 6-membered heterocyclic group.

(3) The optical information recording medium according to item (1) or (2) above, wherein $R^{11}$, $R^{21}$ and $R^{31}$ in formulae (I), (II) and (III) each is an aryl group or a heterocyclic group.

(4) The optical information recording medium according to item (1) or (2) above, wherein $R^{13}$ and $R^{23}$ in formulae (I) and (II) each is an aryl group or a heterocyclic group.

(5) The optical information recording medium according to any one of items (1) to (4) above, wherein $R^{33}$ in formula (III) is an alkyl group.

(6) The optical information recording medium according to any one of items (1) to (5) above, wherein the dye compound is a compound of formulae (I), (II) or (III) wherein a pair of $R^{11}$ and $L^{11}$, $R^{21}$ and $L^{21}$, or $R^{31}$ and $L^{31}$, respectively is combined to form a ring.

(7) The optical information recording medium according to any one of items (1) to (6) above, wherein the dye compound is represented by the following formula (I-A), (II-A) or (III-A):

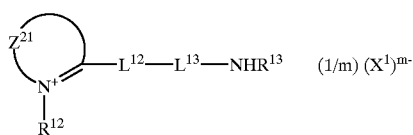

wherein $Z^{11}$ represents an atomic group necessary for forming a 5- or 6-membered nitrogen- containing heterocyclic ring which may have a substituent, $R^{12}$ and $R^{13}$ each independently represents an alkyl group, an aryl group, an aralkyl group or a heterocyclic group, $L^{12}$ and $L^{13}$ each independently represents a methine group which may have a substituent, $(X^{1})^{m-}$ represents an organic or inorganic m-valent anion, and m represents an integer or 1 to 5;

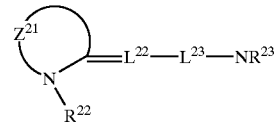

wherein $Z^{21}$ represents an atomic group necessary for forming a 5- or 6-membered nitrogen-containing heterocyclic ring which may have a substituent, $R^{22}$ and $R^{23}$ each independently represents an alkyl group, an aryl group, an aralkyl group or a heterocyclic group, and $L^{22}$ and $L^{23}$ each independently represents a methine group which may have a substituent;

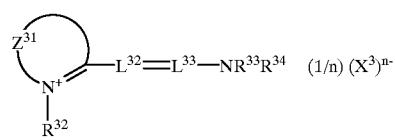

wherein $Z^{31}$ represents an atomic group necessary for forming a 5- or 6-membered nitrogen-containing heterocyclic ring which may have a substituent, $R^{32}$ represents an alkyl group, an aryl group, an aralkyl group or a heterocyclic group, $R^{33}$ and $R^{34}$ each independently represents an alkyl group, an aralkyl group or a heterocyclic group, $L^{32}$ and $L^{33}$ each represents a methine group which may have a substituent, $(X^{3})^{n-}$ represents an organic or inorganic n-valent anion, and n represents an integer of 1 to 5.

(8) The optical information recording medium according to item (1) above, wherein the dye compound is represented by the following formula (I-B), (II-B) or (III-B):

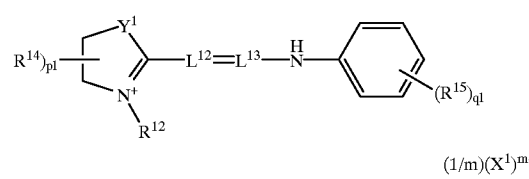

wherein $Y^{1}$ represents —O—, —S—, —Se—, —$NR^{16}$— or —$CR^{17}R^{18}$—, $R^{12}$ and $R^{16}$ each independently represents an alkyl group, an aryl group, an aralkyl group or a heterocyclic group, $R^{17}$ and $R^{18}$ each represents a hydrogen atom, an alkyl group, an aryl group, an aralkyl group or a heterocyclic group, $R^{14}$ represents a substituent on a carbon atom of the azole ring or a condensed ring, $R^{15}$ represents a substituent on the benzene ring, $L^{12}$ and $L^{13}$ each independently represents a methine group which may have a substituent, p1 represents an integer of 0 to 4, provided that when p1 is an integer of 2 or more, the plurality of $R^{14}$s may be the same or different, q1 represents an integer of 0 to 5, provided that when q1 is an integer of 2 or more, the plurality of $R^{15}$s may be the same or different, $(X^{1})^{m-}$ represents an organic or inorganic m-valent anion, and m represents an integer of 1 to 5;

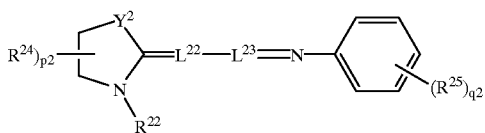

(II-B)

wherein $Y^2$ represents —O—, —S—, —Se—, —NR$^{26}$— or —CR$^{27}$R$^{28}$—, R$^{22}$ and R$^{26}$ each independently represents an alkyl group, an aryl group, an aralkyl group or a heterocyclic group, R$^{27}$ and R$^{28}$ each represents a hydrogen atom, an alkyl group, an aryl group, an aralkyl group or a heterocyclic group, R$^{24}$ represents a substituent on a carbon atom of the azole ring or a condensed ring, R$^{25}$ represents a substituent on the benzene ring, L$^{22}$ and L$^{23}$ each independently represents a methine group which may have a substituent, p2 represents an integer of 0 to 4, provided that when p2 is an integer of 2 or more, the plurality of R$^{24}$s may be the same or different, q2 represents an integer of 0 to 5, provided that when q2 is an integer of 2 or more, the plurality of R$^{25}$s may be the same or different;

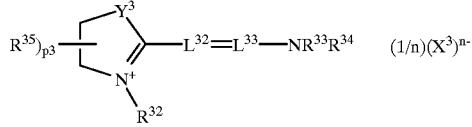

(III-B)

wherein $Y^3$ represents —O—, —S—, —Se—, —NR$^{36}$— or —CR$^{37}$R$^{38}$—, R$^{32}$ and R$^{36}$ each independently represents an alkyl group, an aryl group, an aralkyl group or a heterocyclic group, R$^{37}$ and R$^{38}$ each represents a hydrogen atom, an alkyl group, an aryl group, an aralkyl group or a heterocyclic group, R$^{35}$ represents a substituent on a carbon atom of the azole ring or a condensed ring, L$^{32}$ and L$^{33}$ each independently represents a methine group which may have a substituent, p3 represents an integer of 0 to 4, provided that when p3 is an integer of 2 or more, the plurality of R$^{35}$s may be the same or different, R$^{33}$ and R$^{34}$ each independently represents an alkyl group, an aralkyl group or a heterocyclic group, (X$^3$)$^{n-}$ represents an organic or inorganic n-valent anion, and n represents an integer of 1 to 5.

(9) The optical information recording medium according to any one of items (1) to (8) above, wherein the substrate is a transparent disk-like substrate having on a surface thereof a pregroove with a track pitch of 0.2 to 0.8 μm, and the recording layer is provided on the pregroove-having surface of the substrate.

(10) The optical information recording medium according to any one of items (1) to (9) above, further comprising a light-reflecting layer which comprises a metal and is provided on the recording layer.

(11) The optical information medium according to any one of items (1) to (10) above, further comprising a protective layer provided above the recording layer.

(12) A method for recording information, comprising irradiating a laser at a wavelength of 550 nm or less on an optical information recording medium according to any one of items (1) to (11) above to record information.

DETAILED DESCRIPTION OF THE INVENTION

The optical information recording medium of the present invention is characterized in that the recording layer contains a compound represented by the following formula (I), (II) or (III):

wherein $R^{11}$, $R^{12}$ and $R^{13}$ each independently represents an alkyl group, an aryl group, an aralkyl group or a heterocyclic group, $L^{11}$, $L^{12}$ and $L^{13}$ each independently represents a methine group which may have a substituent, $(X^1)^{m-}$ represents an organic or inorganic m-valent anion, m represents an integer of 1 to 5, and any two of $R^{11}$, $R^{12}$, $R^{13}$, $L^{11}$, $L^{12}$ and $L^{13}$ may combine to form a ring;

$$R^{21}R^{22}N—L^{21}=L^{22}—L^{23}=NR^{23} \qquad (II)$$

wherein $R^{21}$, $R^{22}$ and $R^{23}$ each independently represents an alkyl group, an aryl group, an aralkyl group or a heterocyclic group, $L^{21}$, $L^{22}$ and $L^{23}$ each independently represents a methine group which may have a substituent, and any two of $R^{21}$, $R^{22}$, $R^{23}$, $L^{21}$, $L^{22}$ and $L^{23}$ may combine to form a ring;

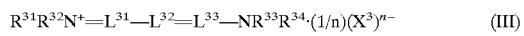

wherein $R^{31}$ and $R^{32}$ each independently represents an alkyl group, an aryl group, an aralkyl group or a heterocyclic group, $R^{33}$ and $R^{34}$ each independently represents an alkyl group, an aralkyl group or a heterocyclic group, $L^{31}$, $L^{32}$ and $L^{33}$ each independently represents a methine group which may have a substituent, $(X^3)^{n-}$ represents an organic or inorganic n-valent anion, n represents an integer of 1 to 5, and any two of $R^{31}$, $R^{32}$, $R^{33}$, $R^{34}$, $L^{31}$, $L^{32}$ and $L^{33}$ may combine to form a ring.

In formulae (I), (II) and (III), the alkyl groups represented by $R^{11}$, $R^{12}$, $R^{13}$, $R^{21}$, $R^{22}$, $R^{23}$, $R^{31}$, $R^{32}$, $R^{33}$ and $R^{34}$ each is preferably a chained or cyclic alkyl group having from 1 to 20 carbon atoms (e.g., methyl, ethyl, n-propyl, isopropyl, n-butyl, isobutyl, sec-butyl, tert-butyl, methoxyethyl, hydroxyethyl, n-pentyl, isopentyl, cyclohexyl), which may have a substituent, more preferably an alkyl group having from 1 to 6 carbon atoms, still more preferably methyl, ethyl, n-propyl, n-butyl or methoxyethyl.

In formulae (I), (II) and (III), the aryl groups represented by $R^{11}$, $R^{12}$, $R^{13}$, $R^{21}$, $R^{22}$, $R^{23}$, $R^{31}$ and $R^{32}$ each is preferably and aryl group having from 6 to 18 carbon atoms (e.g., phenyl, 1-naphthyl, 2-naphthyl, 1-anthracenyl), which may have a substituent, more preferably phenyl, 1-naphthyl or 2-naphthyl, still more preferably phenyl.

In formulae (I), (II) and (III), the aralkyl groups represented by $R^{11}$, $R^{12}$, $R^{13}$, $R^{21}$, $R^{22}$, $R^{23}$, $R^{31}$, $R^{32}$, $R^{33}$ and $R^{34}$ each is preferably an aralkyl group having from 7 to 18 carbon atoms (e.g., benzyl, phenethyl, anisyl), more preferably benzyl.

In formulae (I), (II) and (II), the heterocyclic groups represented by $R^{11}$, $R^{12}$, $R^{13}$, $R^{21}$, $R^{22}$, $R^{23}$, $R^{31}$, $R^{32}$, $R^{33}$ and $R^{34}$ each is preferably a saturated or unsaturated heterocyclic group having from 4 to 7 carbon atoms. The heteroatom contained is preferably nitrogen atom, oxygen atom or sulfur atom and examples of the heterocyclic ring include 4-pyridyl, 2-pyridyl, 2-pyrazyl, 2-imidazolyl, 2-furyl, 2-thiophenyl, 2-benzoxazolyl and 2-benzothioxazolyl.

In formulae (I), (II) and (III), $R^{11}$, $R^{21}$, $R^{13}$, $R^{23}$ and $R^{31}$ each is preferably an aryl group or a heterocyclic group, more preferably an aryl group, still more preferably phenyl.

In formulae (I), (II) and (III), examples of the substituents of $R^{11}$, $R^{12}$, $R^{13}$, $R^{21}$, $R^{22}$, $R^{23}$, $R^{31}$, $R^{32}$, $R^{33}$ and $R^{34}$ include the followings:

a chained or cyclic alkyl group having from 1 to 20 carbon atoms (e.g., methyl, ethyl, n-propyl, isopropyl, n-butyl), a substituted or unsubstituted aryl group having from 6 to 18 carbon atoms (e.g., phenyl, chlorophenyl, anisyl, toluyl, 2,4-di-t-amyl, 1-naphthyl), an alkenyl group (e.g., vinyl, 2-methylvinyl), an alkynyl group (e.g., ethynyl, 2-methylethynyl, 2-phenylethynyl), a halogen atom (e.g., F, Cl, Br, I), a cyano group, a hydroxyl group, a carboxyl group, an acyl group (e.g., acetyl, benzoyl, salicyloyl, pivaloyl), an alkoxy group (e.g., methoxy, butoxy, cyclohexyloxy), an aryloxy group (e.g., phenoxy, 1-naphthoxy), an alkylthio group (e.g., methylthio, butylthio, benzylthio, 3-methoxypropylthio), an arylthio group (e.g., phenylthio, 4-chlorophenylthio), a substituted amino group (e.g., methylamino, ethylamino, phenylamino, dimethylamino, methylphenylamino), an alkylsulfonyl group (e.g., methanesulfonyl, butanesulfonyl), an arylsulfonyl group (e.g., benzenesulfonyl, paratoluenesulfonyl), a carbamoyl group having from 1 to 10 carbon atoms, an amido group having from 1 to 10 carbon atoms, an imido group having from 2 to 12 carbon atoms, an acyloxy group having from 2 to 10 carbon atoms, an alkoxycarbonyl group having from 2 to 10 carbon atoms, and a heterocyclic group (for example, an aromatic heterocyclic ring such as pyridyl, thienyl, furyl, thiazolyl and imidazolyl, and an aliphatic heterocyclic ring such as pyrrolidine, piperidine, morpholine, pyran, thiopyran, dioxane and dithiolan).

The substituent is preferably an alkyl group having from 1 to 6 carbon atoms, an aryl group having from 6 to 10 carbon atoms (particularly phenyl), an alkoxy group having from 1 to 10 carbon atoms (particularly methoxy) or a halogen atom (particularly chlorine atom), more preferably an alkyl group having from 1 to 4 carbon atoms (particularly, methyl).

In formulae (I), (II) and (III), the methine groups represented by $L^{11}$, $L^{12}$, $L^{13}$, $L^{21}$, $L^{22}$, $L^{23}$, $L^{31}$, $L^{32}$ and $L^{33}$ each is independently a methine group which may have a substituent. Examples of the substituent include those described above as the substituent examples of $R^{11}$, $R^{12}$, $R^{13}$, $R^{21}$, $R^{22}$, $R^{23}$, $R^{31}$, $R^{32}$, $R^{33}$ and $R^{34}$. the methine groups represented by $L^{11}$, $L^{12}$, $L^{13}$, $L^{21}$, $L^{22}$, $L^{23}$, $L^{31}$, $L^{32}$ and $L^{33}$ each is preferably an unsubstituted methine group or a methine group substituted by an alkyl group having from 1 to 4 carbon atoms (e.g., methyl, ethyl), a phenyl group, a chlorine atom, a carbamoyl group having from 1 to 8 carbon atoms, an amido group having from 1 to 8 carbon atoms, or an imido group having from 2 to a carbon atoms, more preferably an unsubstituted methine group or a methine group substituted by methyl or phenyl.

In formula (I), any two of $R^{11}$, $R^{12}$, $R^{13}$, $L^{11}$, $L^{12}$ and $L^{13}$ may combine to form a ring and examples of the pair include $R^{11}$ and $L^{11}$, $R^{12}$ and $L^{11}$, $R^{13}$ and $L^{13}$, and $R^{11}$ and $R^{12}$. Among these, the case where $R^{11}$ and $L^{11}$ are combined to form a nitrogen-containing heterocyclic ring is preferred and in this case, the ring structure is preferably a 5- or 6-membered ring, more preferably a 5-membered ring.

In formula (II), any two of $R^{21}$, $R^{22}$, $R^{23}$, $L^{21}$, $L^{22}$ and $L^{23}$ may combine to form a ring and examples of the pair include $R^{21}$ and $L^{21}$, $R^{23}$ and $L^{23}$, and $R^{21}$ and $R^{22}$. Among these, the case where $R^{21}$ and $L^{21}$ are combined to form a nitrogen-containing heterocyclic ring is preferred and in this case, the ring structure is preferably a 5- or 6-membered ring, more preferably a 5-membered ring.

In formula (III), any two of $R^{31}$, $R^{32}$, $R^{33}$, $R^{34}$, $L^{31}$, $L^{32}$ and $L^{33}$ may combine to form a ring and particularly, $R^{31}$ and $L^{31}$ are preferably combine to form a nitrogen-containing heterocyclic ring. In this case, the ring structure is preferably a 5- or 6-membered ring, more preferably a 5-membered ring. The 5-membered ring may be condensed with an aromatic ring (e.g., benzene ring, naphthalene ring). In addition, preferred examples of the ring formed by $R^{33}$ and $R^{34}$ include pyrrolidine, piperazine, piperidine and morpholine rings.

The m-valent anion represented by $(X^1)^{m-}$ and the n-valent anion represented by $(X^3)^{n-}$ may be an inorganic anion or an organic anion. Examples of the inorganic anion include halide ion, chlorate ion, perchlorate ion, sulfate ion, hydrogensulfate ion, phosphate ion, hydrogenphosphate ion and tungstophosphate ion. Examples of the organic anion include carboxylate ion (e.g., acetate ion, trifluoroacetate ion, benzoate ion, succinate ion, maleate ion, fumarate ion, terephthalate ion), sulfonate ion (e.g., methanesulfonate ion, trifluoromethanesulfonate ion, butane-1,4-disulfonate ion, cyclohexane-1,4-disulfonate ion, benzene-1,3-disulfonate ion, 3,3'-biphenyldisulfonate ion, naphthalene-1,5-disulfonate ion, naphthalene-1,6-disulfonate ion, naphthalene-2,6-disulfonate ion, 1-methylnaphthalene-2,6-disulfonate ion, naphthalene-2,7-disulfonate ion, naphthalene-2,8-disulfonate ion, 1-naphthol-3,6-disulfonate ion, 2-naphthol-3,6-disulfonate ion, 2,7-dihydroxy-3,6-disulfonate ion, 2-naphthol-6,8-disulfonate ion, 1,8-dihydroxynaphthalene-3,6-disulfonate ion, 1,5-dihydroxynaphthalene-2,6-disulfonate ion, naphthalene-1,3,5-trisulfonate ion, naphthalene-1,3,6-trisulfonate ion, naphthalene-1,3,7-trisulfonate ion, 1-naphthol-3,6,8-trisulfonate ion, 2-naphthol-3,6,8-trisulfonate ion, naphthalene-1,3,5,7-tetrasulfonate ion) and polysulfuric acid monoesters (e.g., propylene glycol-1,2-disulfate, polyvinyl alcohol polysulfuric acid ester ion). In the present invention, n is preferably a valence of 1 to 4, more preferably 1 to 3, still more preferably 2.

The compounds represented by formulae (I-A), (II-A) and (III-A) are described below.

Examples of the heterocyclic ring formed by $Z^{11}$, $Z^{21}$ and $Z^{31}$ include a thiazoline ring, a thiazole ring, a benzothiazole ring, an oxazoline ring, an oxazole ring, a benzoxazole ring, a selenazoline ring, a selenazole ring, a benzoselenazole ring, a 3,3-dialkylindolenine ring (e.g., 3,3-dimethylindolenine), a 3,3-dialkylbenzoylindolenine ring (e.g., 3,3-dimethylbenzoindolenine), an imidazoline ring, an imidazole ring, a benzimidazole ring, a 2-pyridine ring, a 2-quinoline ring, a 1-isoquinoline ring, a 3-isoquinoline ring, an imidazo[4,5-b]quinoxaline ring, an oxadiazole ring, a thiadiazole ring, a tetrazole ring and pyrimidine ring. Among these, preferred are a thiazoline ring, a benzothiazole ring, a benzoxazole ring, a 3,3-dialkylindolenine ring (e.g., 3,3-dimethylindolenine), a 3,3-dialkyolbenzoindolenine ring (e.g., 3,3-dimethylbenzoindolenine), a benzimidazole ring, a 2-pyridine ring, a 2-quinoline ring, a 1-isoquinoline ring and a 3-isoquinoline ring, more preferred are a thiazoline ring, a benzothiazole ring, a benzoxazole ring, a 3,3-dialkylindolenine ring (e.g., 3,3-dimethylindolenine), a 3,3-dialkylbenzindolenine ring (e.g., 3,3-dimethylindolenine), a 3,3-dialkylbenzindolenine ring (e.g., 3,3-dimethylbenzindolenine) and a benzimidazole ring, still more preferred are a thiazoline ring, a benzothiazole ring, a benzoxazole ring, a benzimidazole ring and a 3,3-dimethylindolenine ring.

$R^{13}$ and $R^{23}$ each is preferably an aryl group (e.g., phenyl, naphthyl) or a heterocyclic group (e.g., pyridyl, pyrazyl), more preferably phenyl or 3-pyridyl, still more preferably phenyl.

$R^{12}$ is preferably an alkyl group (more preferably methyl, ethyl, n-propyl, n-butyl, i-pentyl, methoxyethyl, phenoxyethyl, vinylmethyl), an aralkyl group (more preferably benzyl) or an aryl group (more preferably phenyl).

$R^{22}$ is preferably an alkyl group (more preferably methyl, ethyl, n-butyl, i-pentyl, n-hexyl, phenoxyethyl, isopropoxycarbonylmethyl), an aralkyl group (more preferably benzyl, phenethyl) or an aryl group (more preferably phenyl).

$R^{32}$ is preferably an alkyl group (more preferably methyl, ethyl, n-propyl, n-butyl, i-butyl, n-pentyl, methoxyethyl or 2,2,3,3-tetrafluoropropyl), an aralkyl group (more preferably benzyl or phenethyl) or an aryl group (more preferably phenyl).

$R^{33}$ and $R^{34}$ each is preferably an alkyl group (more preferably methyl, ethyl, n-propyl, n-butyl, n-hexyl, i-pentyl, methoxyethyl, phenoxyethyl, 3-i-propoxycarbonylpropyl) or an aralkyl group (more preferably benzyl), still more preferably an alkyl group. In particular, $R^{33}$ and $R^{34}$ preferably combine with each other to form a ring structure together with the nitrogen atom.

$L^{12}$ and $L^{13}$ each is preferably an unsubstituted methine group.

$L^{22}$ is preferably unsubstituted methine group. $L^{23}$ is preferably an unsubstituted methine group or a methine group substituted by a halogen atom (preferably chlorine atom) or an alkyl group (preferably methyl).

$L^{32}$ and $L^{33}$ each is preferably an unsubstituted methine group.

The dye compounds represented by formulae (I), (II) and (III) each preferably has a structure represented by the following formula (I-B), (II-B) or (III-B):

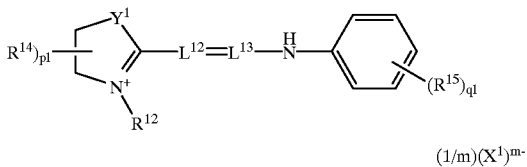

(I-B)

$(1/m)(X^1)^{m-}$ wherein $Y^1$ represents —O—, —S—, —Se—, —NR$^{16}$— or —CR$^{17}$R$^{18}$—, $R^{12}$ and $R^{16}$ each independently represents an alkyl group, an aryl group, an aralkyl group or a heterocyclic group, $R^{17}$ and $R^{18}$ each represents a hydrogen atom, an alkyl group, an aryl group, an aralkyl group or a heterocyclic group, $R^{14}$ represents a substituent on a carbon atom of the azole ring or a condensed ring, $R^{15}$ represents a substituent on the benzene ring, $L^{12}$ and $L^{13}$ each independently represents a methine group which may have a substituent, p1 represents an integer of 0 to 4, provided that when p1 is an integer of 2 or more, the plurality of R$^{14}$s may be the same or different, q1 represents an integer of 0 to 5, provided that when q1 is an integer of 2 or more, the plurality of R$^{15}$s may be the same or different, $(X^1)^{m-}$ represents an organic or inorganic m-valent anion, and m represents an integer of 1 to 5;

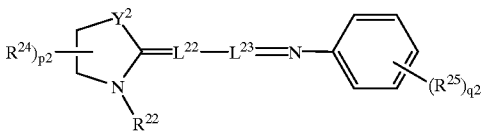

(II-B)

wherein $Y^2$ represents —O—, —S—, —Se—, —NR$^{26}$— or —CR$^{27}$R$^{28}$—, $R^{22}$ and $R^{26}$ each independently represents an alkyl group, an aryl group, an aralkyl group or a heterocyclic group, $R^{27}$ and $R^{28}$ each represents a hydrogen atom, an alkyl group, an aryl group, an aralkyl group or a heterocyclic group, $R^{24}$ represents a substituent on a carbon atom of the azole ring or a condensed ring, $R^{25}$ represents a substituent on the benzene ring, $L^{22}$ and $L^{23}$ each independently represents a methine group which may have a substituent, p2 represents an integer of 0 to 4, provided that when p2 is an integer of 2 or more, the plurality of R$^{24}$s may be the same or different, q2 represents an integer of 0 to 5, provided that when q2 is an integer of 2 or more, the plurality of R$^{25}$s may be the same or different;

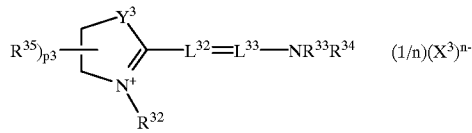

(III-B)

$(1/n)(X^3)^{n-}$ wherein $Y^3$ represents —O—, —S—, —Se—, —NR$^{36}$— or —CR$^{37}$R$^{38}$—, $R^{32}$ and $R^{36}$ each independently represents an alkyl group, an aryl group, an aralkyl group or a heterocyclic group, $R^{37}$ and $R^{38}$ each represents a hydrogen atom, an alkyl group, an aryl group, an aralkyl group or a heterocyclic group, $R^{35}$ represents a substituent on a carbon atom of the azole ring or a condensed ring, $L^{32}$ and $L^{33}$ each independently represents a methine group which may have a substituent, p3 represents an integer of 0 to 4, provided that when p3 is an integer of 2 or more, the plurality of R$^{35}$s may be the same or different, $R^{33}$ and $R^{34}$ each independently represents an alkyl group, an aralkyl group or a heterocyclic group, $(X^3)^{n-}$ represents an organic or inorganic n-valent anion, and n represents an integer of 1 to 5.

In formulae (I-B), (II-B) and (III-B), preferred examples of the alkyl group, the aryl group, the aralkyl group and the heterocyclic group represented by any one of $R^{12}$, $R^{15}$, $R^{16}$, $R^{17}$, $R^{18}$, $R^{22}$, $R^{25}$, $R^{26}$, $R^{27}$, $R^{28}$, $R^{32}$, $R^{36}$, $R^{37}$ and $R^{38}$ are the same as the preferred examples of the alkyl group, aryl group, aralkyl group and heterocyclic group represented by $R^{11}$, $R^{12}$, $R^{13}$, $R^{21}$, $R^{22}$, $R^{23}$, $R^{31}$ and $R^{32}$ in formulae (I), (II) and (III).

In formula (III-B), preferred examples of the alkyl group, the aryl group, the aralkyl group and the heterocyclic group represented by $R^{33}$ and $R^{34}$ are the same as the preferred examples of the alkyl group, aryl group, aralkyl group and heterocyclic group represented by $R^{11}$, $R^{12}$, $R^{13}$, $R^{21}$, $R^{22}$, $R^{23}$, $R^{31}$ and $R^{32}$ in formulae (I), (II) and (III). In addition, it is also preferred that $R^{33}$ and $R^{34}$ combine to form a pyrrolidine, piperazine, piperidine or morpholine ring.

In formulae (I-B), (II-B) and (III-B), preferred examples of the methine group represented by $L^{12}$, $L^{13}$, $L^{22}$, $L^{23}$, $L^{32}$ and $L^{33}$ are the same as the preferred examples of the methine group represented by $L^{12}$, $L^{13}$, $L^{22}$, $L^{23}$, $L^{32}$ and $L^{33}$ in formulae (I), (II) and (III).

In formulae (I-B), (II-B) and (III-B), examples of the substituents represented by $R^{14}$, $R^{15}$, $R^{24}$, $R^{25}$ and $R^{35}$ are the same as the examples of the substituents of $R^{11}$, $R^{12}$, $R^{13}$, $R^{21}$, $R^{22}$, $R^{23}$, $R^{31}$, $R^{32}$, $R^{33}$ and $R^{34}$ in formulae (I-B), (II-B) and (III-B).

In formulae (I-B), (II-B) and (III-B), examples of the condensed ring represented by $R^{14}$ and $R^{24}$ include benzene, naphthalene, anthracene, phenanthrene, pyridine, pyrimidine, benzoquinone, furan, thiophene, pyrrole, pyrazole and imidazole. The condensed ring is preferably an aromacarbon ring such as benzene, naphthalene, anthracene or phenanthrene, more preferably benzene or naphthalene.

In formulae (I-B), (II-B) and (III-B), $Y^1$, $Y^2$ and $Y^3$ is preferably —O—, —S—, —NR$^{26}$— (R$^{26}$: an alkyl group) or —CR$^{27}$R$^{28}$— (R$^{27}$ and R$^{28}$: an alkyl group), more preferably —O—, —S—, —NR$^{26}$ (R$^{26}$: an alkyl group having from 1 to 4 carbon atoms) or —C(CH$_3$)$_2$—, still more preferably the case where R$^{14}$ forms a condensed ring (e.g., benzene ring, naphthalene ring).

In formula (I-B), a combination where $Y^1$ is —O—, —S—, —NR$^{26}$— (R$^{26}$: an alkyl group having from 1 to 4 carbon atoms) or —C(CH$_3$)$_2$—, R$^{14}$ forms a condensed ring (particularly a benzene ring), R$^{12}$ is an alkyl group (e.g., methyl, ethyl, n-propyl, n-butyl, i-pentyl, methoxyethyl, phenoxyethyl, allyl), an aralkyl group (e.g., benzyl) or an aryl group (e.g., phenyl), (1) q is 0 or (2) q is 1, and R$^{15}$ is a halogen atom (e.g., F, Cl, Br, I, preferably chlorine atom), an alkoxy group (e.g., methoxy, butoxy, cyclohexyloxy, preferably methoxy), an alkyl group (e.g., methyl, ethyl, n-propyl, isopropyl, n-butyl, preferably methyl) or an alkoxycarbonyl group (e.g., methoxycarbonyl, butoxycarbonyl, preferably ethoxycarbonyl), is preferred.

In formula (II-B), a combination where $Y^2$ is —O—, —S—, —NR$^{26}$— (R$^{26}$: an alkyl group having from 1 to 4 carbon atoms) or —C(CH$_3$)$_2$—, R$^{22}$ is an alkyl group (preferably methyl, ethyl, n-butyl, i-pentyl, n-hexyl, phenoxyethyl, isopropoxy carbonylmethyl), an aralkyl group (preferably benzyl or phenethyl) or an aryl group (preferably phenyl), (1) q is 0 or (2) q is 1 or 2, and R$^{25}$ is a halogen atom (e.g., F, Cl, Br, I, preferably chlorine atom), an alkyl group (e.g., methyl, ethyl, n-propyl, isopropyl, n-butyl, preferably methyl), an alkoxycarbonyl group (e.g., methoxycarbonyl, butoxycarbonyl, preferably ethoxycarbonyl), a substituted amino group (preferably methylphenylamino) or a 5-membered ring (preferably 2H-1,3-dioxole ring), is preferred.

In formulae (I-B) and (III-B), preferred examples of the organic or inorganic m-valent anion represented by $(X^1)^{m-}$ and the organic or inorganic n-valent anion represented by $(X^3)^{n-}$ are the same as the preferred examples of the organic or inorganic m-valent anion represented by $(X^1)^{m-}$ in formula (I) and the organic or inorganic n-valent anion represented by $(X^3)^{n-}$ in formula (III).

The compounds represented by formula (I), (II) or (III) may combine at an arbitrary position to form a multimer and in this case, respective units may be the same or different. The compound may also be bonded to a polymer chain such as polystyrene, polymethacrylate, polyvinyl alcohol and cellulose.

The compound represented by formula (III) preferably forms a dimer, more preferably a dimer represented by the following formula (III-C):

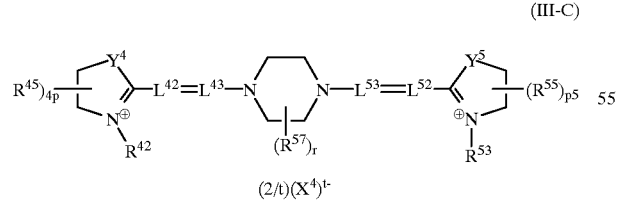

(III-C)

wherein $Y^4$ and $Y^5$ each independently represents —O—, —S—, —Se—, —NR$^{46}$— or —CR$^{47}$R$^{48}$—, R$^{42}$, R$^{52}$ and R$^{46}$ each independently represents an alkyl group, an aryl group, an aralkyl group or a heterocyclic group, R$^{47}$ and R$^{48}$ each independently represents a hydrogen atom, an alkyl group, an aryl group, an aralkyl group or a heterocyclic group, R$^{45}$ and R$^{55}$ each independently represents a substituent on a carbon atom of the azole group or a condensed ring, p4 and p5 each independently represents an integer of 0 to 4, provided that when p4 and p5 each is an integer of 2 or more, the plurality of R$^{45}$s may be the same or different and the plurality of R$^{55}$s may be the same or different, L$^{42}$, L$^{43}$, L$^{52}$ and L$^{53}$ each independently represents a methine group which may have a substituent, R$^{57}$ represents a substituent on a carbon atom on the piperazine ring or a condensed ring, r represents an integer of 0 to 8, $(X^4)^{t-}$ represents an organic or inorganic t-valent anion, and t represents an integer of 1 to 5.

In formula (III-C), $Y^4$, $Y^5$, R$^{42}$, R$^{52}$, R$^{46}$, R$^{47}$, R$^{48}$, R$^{45}$, R$^{55}$, L$^{42}$, L$^{43}$, L$^{52}$, L$^{53}$, $(X^4)^{t-}$, p4, p5 and t each has the same preferred range as the range preferred for the corresponding site or numerical value in formula (III-B). Preferred examples of R$^{57}$ are the same as the preferred examples of R$^{35}$ in formula (III-B), and r is preferably from 0 to 4, more preferably from 0 to 2, still more preferably 0.

Specific preferred examples of the compounds represented by formulae (I), (II) and (III) are set forth below, however, the present invention is by no means limited thereto.

Specific Examples of Dye Represented by Formula (I):

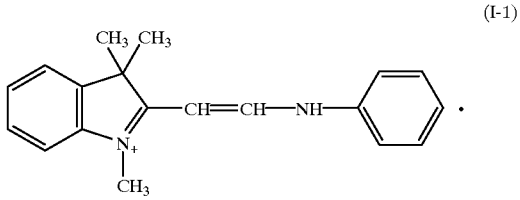

(I-1)

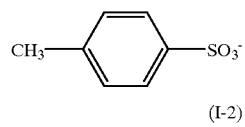

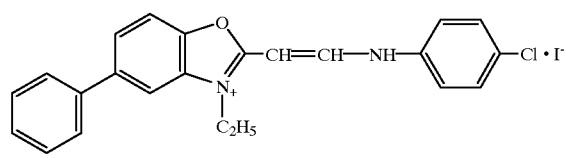

(I-2)

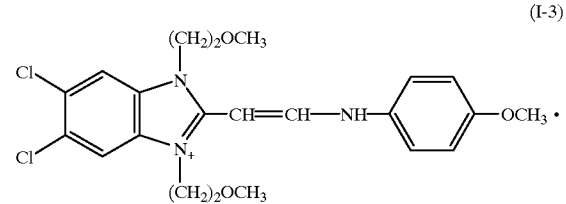

(I-3)

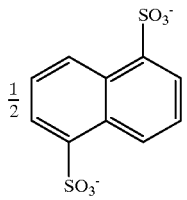

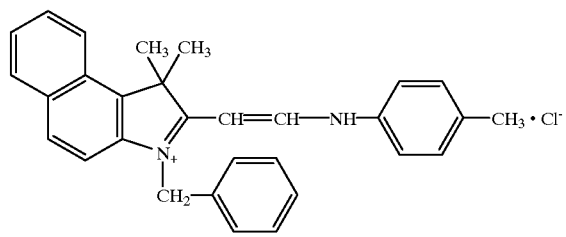
(I-4)
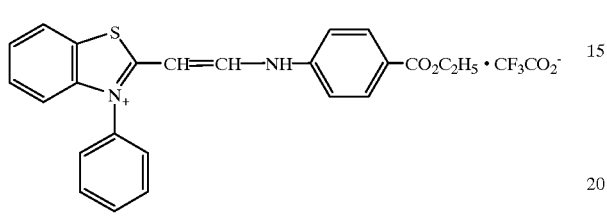
(I-5)
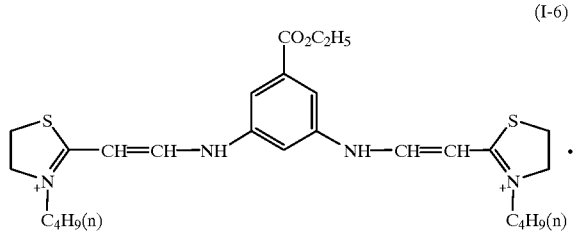
(I-6)
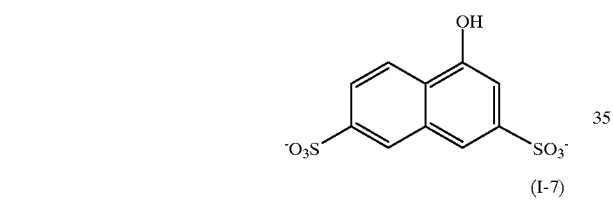
(I-7)
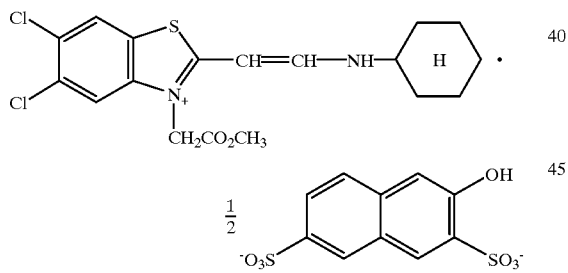
(I-8)
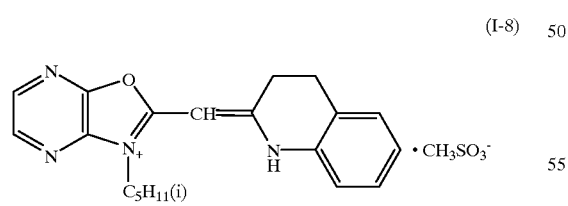
(I-9)
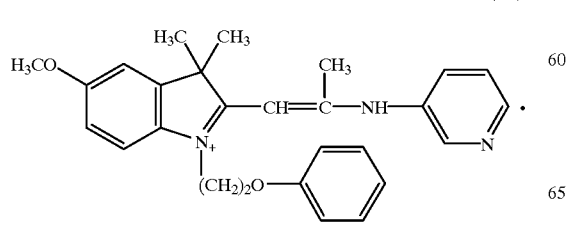
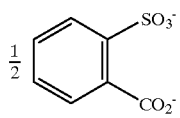
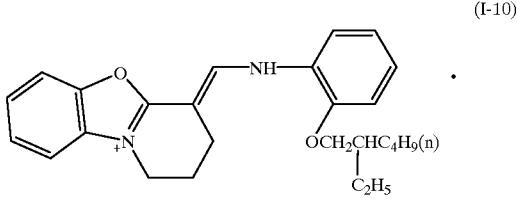
(I-10)
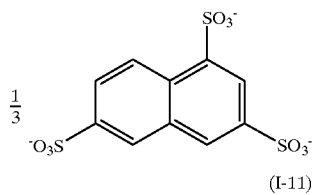
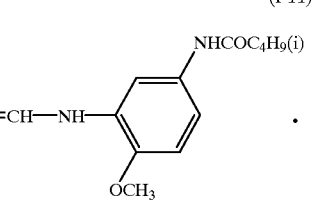
(I-11)
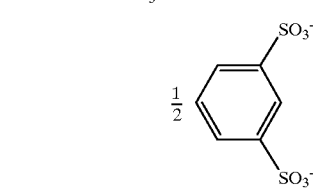
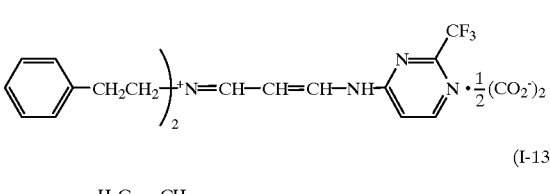
(I-12)
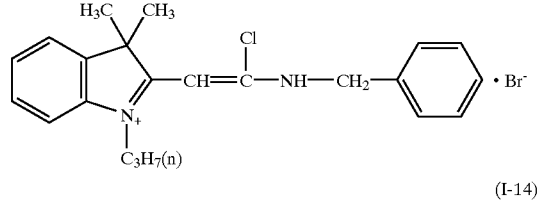
(I-13)
(I-14)
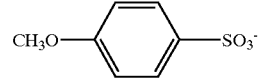

(I-15)
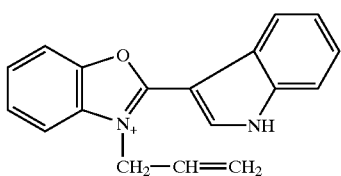
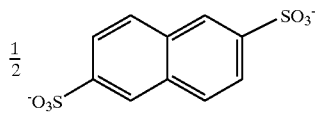
Specific examples of Dye Represented by Formula (II):
(II-1)
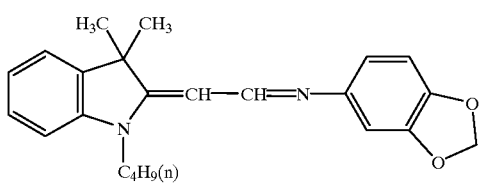
(II-2)
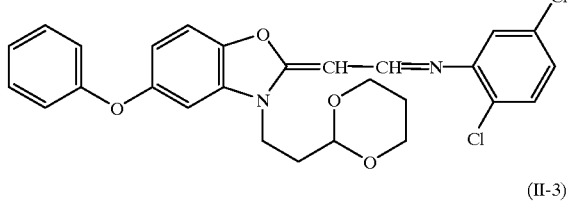
(II-3)
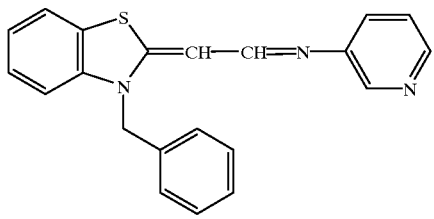
(II-4)
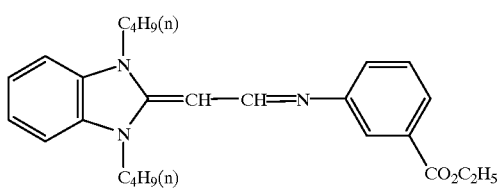
(II-5)
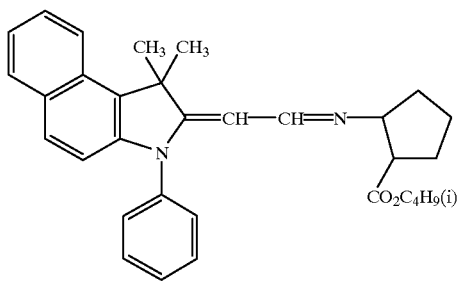
(II-6)
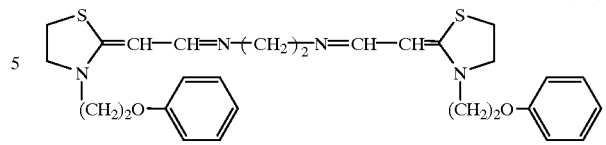
(II-7)
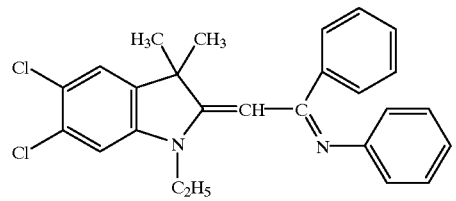
(II-8)
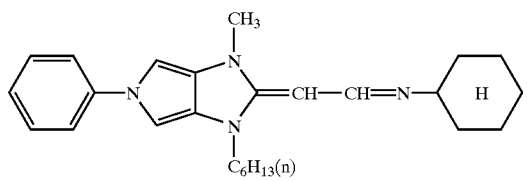
(II-9)
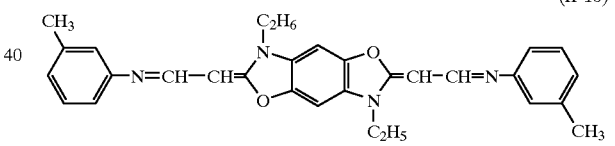
(II-10)
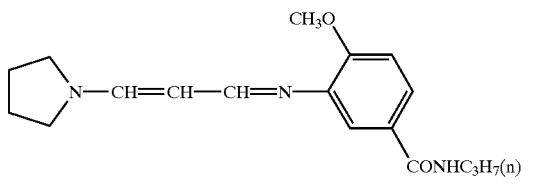
(II-11)
(II-12)
(II-13)
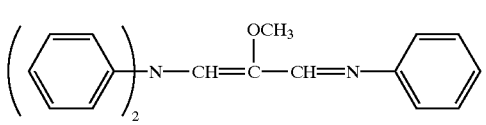

(II-14)
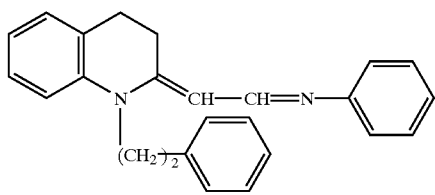
(II-15)
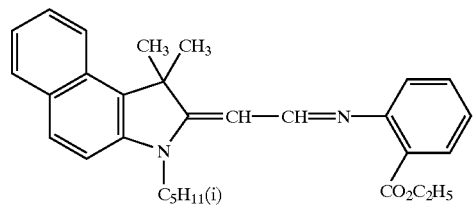
Specific examples of the dye represented by formula (III):
(III-1)
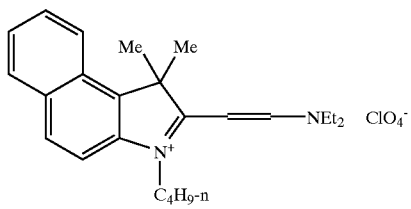
(III-2)
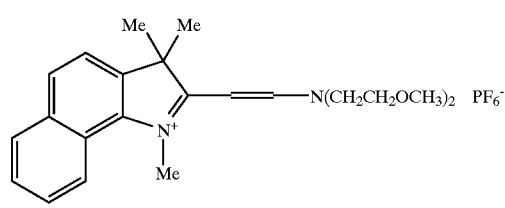
(III-3)
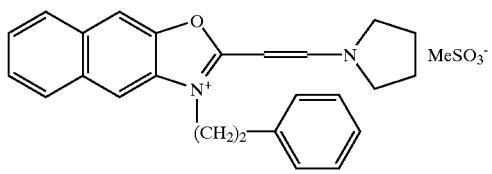
(III-4)
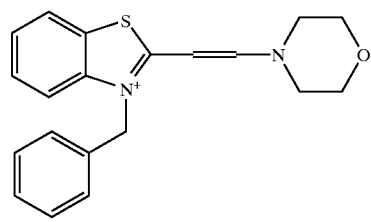
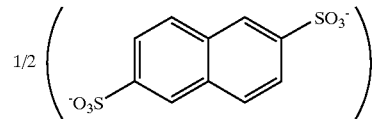
(III-5)
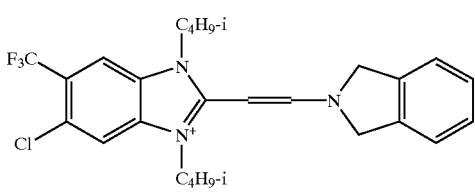
(III-6)
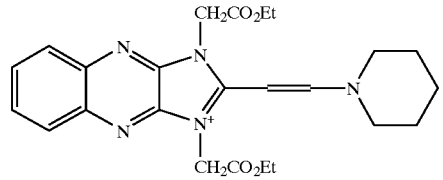
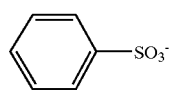
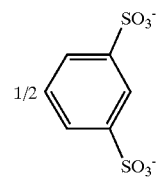

-continued
(III-7) 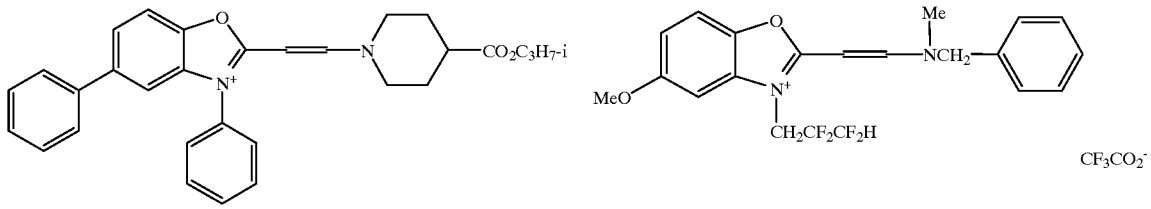 (III-8)
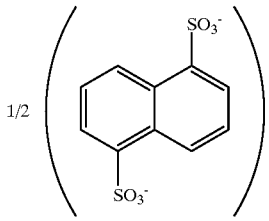
(III-9) 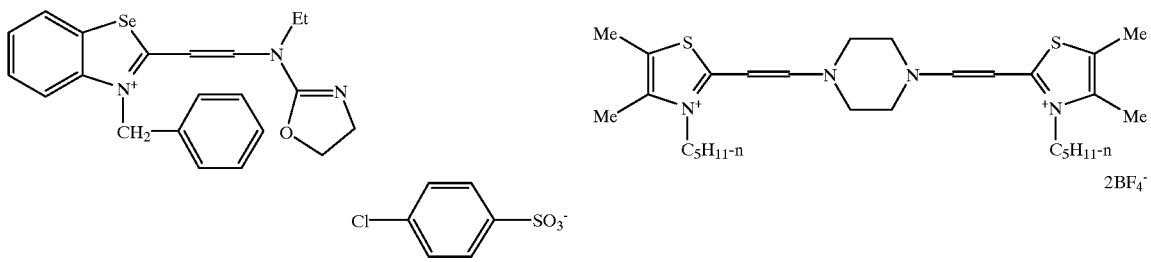 (III-10)
(III-11) 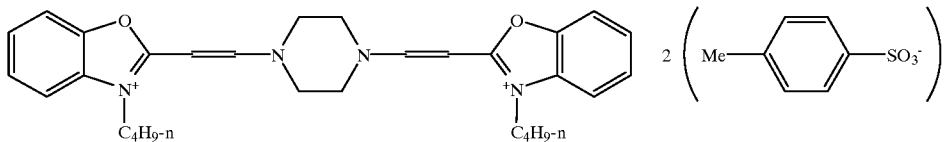
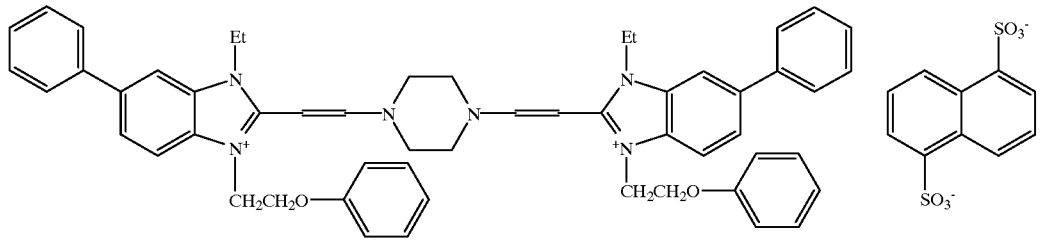 (III-12)
(III-13) 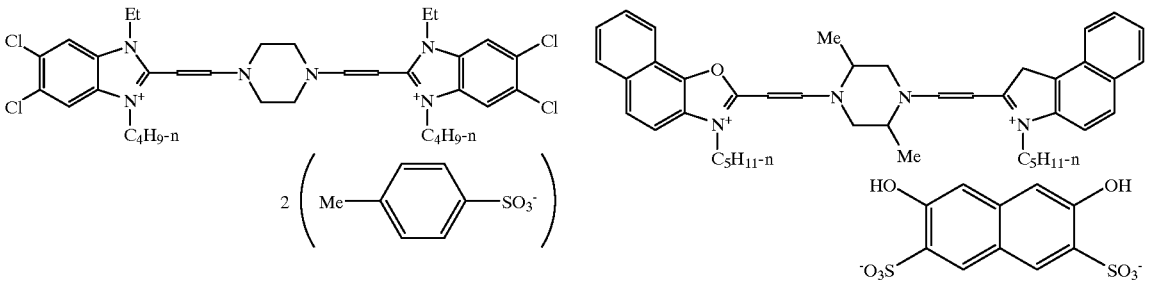 (III-14)

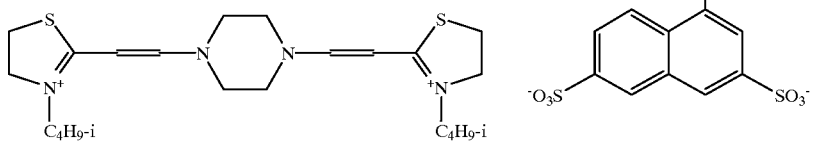

(III-13)

The dyes of the present invention can be synthesized based on the method described, for example, in F. M. Harmer, *Heterocyclic Compounds-Cyanine Dyes and Related Compounds,* John Wiley & Sons, New York, London (1964), D. M. Sturmer, *Heterocyclic Compounds-Special topics in heterocyclic chemistry,* Chap. 18, Sec. 14, Items 482 to 515, John Wiley & Sons, New York, London (1977), and *Rodd's Chemistry of Carbon Compounds,* 2nd Ed., Vol. IV, Part B, Chap. 15, Items 369 to 422, Elsevier Science Publishing Company Inc., New York (1977).

The optical information recording medium of the present invention has a recording layer containing a dye compound represented by formula (I) on the substrate. The optical information recording medium of the present invention includes various structures. The optical information recording medium of the present invention preferably has a structure such that a recording layer is provided on a disk-like substrate having formed thereon a pregroove at a constant track pitch (provided on the surface where the pregroove is formed), a structure such that a light-reflecting layer comprising a metal on that recording layer, or a structure such that a protective layer is provided above that recording layer, more preferably a structure such that a recording layer, a light-reflecting layer and a protective layer are provided in this order on a disk-like substrate having formed thereon a pregroove, or a structure such that a light-reflecting layer, a recording layer and a protective layer are provided in this order on the above-described substrate. Also, a structure where two sheets of laminates each obtained by providing a recording layer and a light-reflecting layer on a transparent disk-like substrate having thereon a pregroove at a constant track pitch are combined, is preferred.

For the optical information recording medium of the present invention, a substrate on which a pregroove having a narrow track pitch as compared CD-R or DVD-R is formed may be used so as to achieve higher recording density. In the case of the optical information recording medium of the present invention, the track pitch is preferably from 0.3 to 0.8 μm, more preferably from 0.4 to 0.6 μm.

The method for producing the optical information recording medium of the present invention is described below by referring as an example to a structure where a recording layer, a light-reflecting layer and a protective layer are provided in this order on a disk-like substrate.

The substrate of the optical information recording medium of the present invention may be freely selected from various materials conventionally used as a substrate of optical recording mediums. Examples of the substrate material include glass, polycarbonate, acrylic resins such as polymethyl methacrylate, vinyl chloride-base resins such as polyvinyl chloride and vinyl chloride copolymer, epoxy resin, amorphous polyolefin and polyester. If desired, these materials may be used in combination. Such a material can be used in the form of a film or as a substrate having a rigidity. Among the above-described materials, polycarbonate is preferred in view of moisture resistance, dimensional stability and cost.

On the substrate surface in the side where the recording layer is provided, an undercoat layer may be provided so as to improve the planeness, increase the adhesion or prevent deterioration of the recording layer. Examples of the material for the undercoat layer include polymer materials such as polymethyl methacrylate, acrylic acid-methacrylic acid copolymer, styrene-maleic anhydride copolymer, polyvinyl alcohol, N-methylolacrylamide, styrene-vinyltoluene copolymer, chlorosulfonated polyethylene, nitrocellulose, polyvinyl chloride, polyolefin chloride, polyester, polyimide, vinyl acetate-vinyl chloride copolymer, ethylene-vinyl acetate copolymer, polyethylene, polypropylene and polycarbonate; and surface modifiers such as silane coupling agent. The undercoat layer may be formed by dissolving or dispersing the above-described material in an appropriate solvent to prepare a coating solution and applying this coating solution to the substrate surface by a coating method such as spin coating, dip coating or extrusion coating. The thickness of the undercoat layer is generally from 0.005 to 20 μm, preferably from 0.01 to 10 μm.

The recording layer can be formed by dissolving the above-described dye compound and if desired, additionally a quencher and a binder in a solvent to prepare a coating solution, applying this coating solution to the substrate surface, and drying the coating film formed. Examples of the solvent for the coating solution include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexane; ethers such as tetrahydrofuran, ethyl ether and dioxane; alcohols such as ethanol, n-propanol, isopropanol and n-butanol diacetone alcohol; fluorine-containing solvents such as 2,2,3,3-tetrafluoropropanol; and glycol ethers such as ethylene glycol monomethyl ether, ethylene glycol monoethyl ether and propylene glycol monomethyl ether. These solvents can be used individually or in combination of two or more by taking account of the solubility of the dye used. The coating solution may further contain various additives such as antioxidant, UV absorbent, plasticizer and lubricant, according to the purpose.

In the case of using a binder, examples of the binder include natural organic polymer substances such as gelatin, cellulose derivative, dextran, rosin and rubber; and synthetic organic polymers including hydrocarbon-base resins such as polyethylene, polypropylene, polystyrene and polyisobutylene, vinyl-base resins such as polyvinyl chloride, polyvinylidene chloride, polyvinyl chloride-polyvinyl acetate copolymer, acrylic resins such as polymethyl acrylate and polymethyl methacrylate, polyvinyl alcohol, chlorinated polyethylene, epoxy resin, butyral resin, rubber derivatives, and initial condensates of thermosetting resin, such as phenol-formaldehyde resin. In the case of using a binder in combination as the material of the recording layer, the amount of the binder used is generally from 0.01 to 50 times (by mass), preferably from 0.1 to 5 times (by mass), the amount of the dye. The thus-prepared coating solution has a dye concentration of generally from 0.01 to 10% by masss, preferably from 0.1 to 5% by mass.

Examples of the coating method include a spraying method, a spin coating method, a dipping method, a roll coating method, a blade coating method, a doctor roll method and a screen printing method. The recording layer may have a single layer structure or a stacked layer structure. The thickness of the recording layer is generally from 20 to 500 nm, preferably from 50 to 300 nm.

The recording layer may contain various discoloration inhibitors so as to improve the light fastness of the recording layer. The discoloration inhibitor generally used is a singlet oxygen quencher. For the single oxygen quencher, those described in already published patent applications can be used. Specific examples thereof include those described in JP-A-58-175693, JP-A-59-81194, JP-A-60-18387, JP-A-60-19586, JP-A-60-19587, JP-A-60-35054, JP-A-60-36190, JP-A-60-36191, JP-A-60-44554, JP-A-60-44555, JP-A-60-44389, JP-A-60-44390, JP-A-60-54892, JP-A-60-47069, JP-A-63-209995, JP-A-4-25492, JP-B-1-38680 (the term "JP-B" as used herein means an "examined Japanese patent publication"), JP-B-6-26028, German Patent 350399, and *Nippon Kagaku Kai Shi* (*Journal of Japan Chemical Society*), page 1141 (October, 1992). Preferred examples of the singlet oxygen quencher include the compound represented by the following formula (IV):

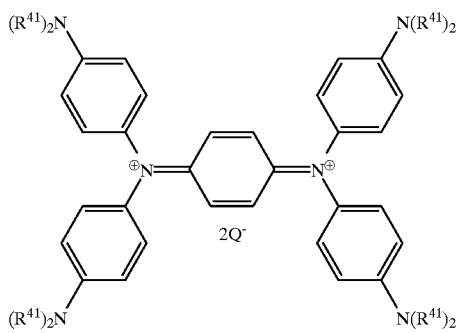

wherein $R^{41}$ represents an alkyl group which may have a substituent, and $Q^-$ represents anion.

In formula (IV), $R^{41}$ is generally an alkyl group having from 1 to 8 carbon atoms, which may be substituted, and preferably an unsubstituted alkyl group having from 1 to 6 carbon atoms. Examples of the substituent of the alkyl group include a halogen atom (e.g., F, Cl), an alkoxy group (e.g., methoxy, ethoxy), an alkylthio group (e.g., methylthio, ethylthio), an acyl group (e.g., acetyl, propionyl), an acyloxy group (e.g., acetoxy, propionyloxy), a hydroxy group, an alkoxycarbonyl group (e.g., methoxycarbonyl, ethoxycarbonyl), an alkenyl group (e.g., vinyl) and an aryl group (e.g., phenyl, naphthyl). Among these, preferred are a halogen atom, an alkoxy group, an alkylthio group and an alkoxycarbonyl group. Preferred examples of the anion represented by $Q^-$ include $ClO_4^-$, $AsF_8^-$, $BF_4^-$ and $SbF_6^-$.

Examples of the compound represented by formula (IV) are shown in Table 1.

TABLE 1

| Compound No. | $R^{31}$ | $Q^-$ |
|---|---|---|
| IV-1 | $CH_3$ | $ClO_4^-$ |
| IV-2 | $C_2H_5$ | $ClO_4^-$ |
| IV-3 | $C_3H_7(n)$ | $ClO_4^-$ |
| IV-4 | $C_4H_9(n)$ | $ClO_4^-$ |
| IV-5 | $C_5H_{11}(n)$ | $ClO_4^-$ |
| IV-6 | $C_4H_9(n)$ | $SbF_6^-$ |
| IV-7 | $C_4H_9(n)$ | $BF_4^-$ |
| IV-8 | $C_4H_9(n)$ | $AsF_6^-$ |

The amount used of the discoloration inhibitor such as singlet oxygen quencher is generally from 0.1 to 50% by mass, preferably from 0.5 to 45% by mass, more preferably from 3 to 40% by mass, still more preferably from 5 to 25% by mass, based on the amount of the dye.

On the recording layer, a light-reflecting layer is preferably provided so as to improve the reflectance at the reproduction of information. The light-reflecting substance as the material of the light-reflecting layer is a substance having a high reflectance to a laser ray and examples thereof include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, semimetal and stainless steel. These substances may be used individually or in combination of two or more thereof or may be used as an alloy. Among those, preferred are Cr, Ni, Pt, Cu, Ag, Au, Al and stainless steel, more preferred are Au metal, Ag metal and alloys thereof, and most preferred are Ag metal and Ag alloy. Preferred examples of the Au or Ag alloy include alloys each containing at least one metal selected from the group consisting of Pt, Cu and Al. The light-reflecting layer can be formed on the recording layer, for example, by vapor-depositing, sputtering or ion-plating the above-described light-reflecting substance. The thickness of the light-reflecting layer is generally from 10 to 300 nm, preferably from 50 to 200 nm.

On the light-reflecting layer, a protective layer is preferably provides so as to physically or chemically protect the recording layer and the like. In the case of employing the same form as in the production of DVD-R type optical information recording medium, namely, where two sheets of substrates are laminated while disposing the recording layer in the inner side, the protective layer is not necessarily required. Examples of the material for use in the protective layer include inorganic substances such as SiO, $SiO_2$, $MgF_2$, $SnO_2$ and $Si_3N_4$, and organic substances such as thermoplastic resin, thermosetting resin and UV curable resin. The protective layer can be formed, for example by laminating a film resulting from extrusion working of a plastic on the reflecting layer through an adhesive or may be provided using vacuum vapor deposition, sputtering or coating. In the case of a thermoplastic resin or thermosetting resin, the protective layer may be formed by dissolving the resin in an appropriate solvent to prepare a coating solution, applying this coating solution and then drying it. In the case of UV curable resin, the protective layer may be formed by coating the resin as it is or in the form of a coating solution prepared by dissolving the resin in an appropriate solvent, and then curing the coating by irradiating UV light thereon. Such a coating solution may further contain various additives such as antistatic agent, antioxidant and UV absorbent, according to the purpose. The thickness of the protective layer is generally from 0.1 to 100 μm. By passing through the above-described steps, a laminate where a recording layer, a light-reflecting layer and a protective layer are provided on a substrate can be produced.

The optical information recording method of the present invention is performed as follows using the optical information recording medium described above. While rotating the optical information recording medium at a constant linear velocity (in the case of CD format, from 1.2 to 1.4 m/sec) or at a constant angular velocity, light for recording, such as semiconductor laser ray, is irradiated from the substrate side or the protective layer side. It is considered that upon this light irradiation, the recording layer absorbs the light and causes local elevation of the temperature to bring about physical or chemical changes (fox example, generation of pits), whereby the optical properties are changed and the information is recorded. In the present invention, a semiconductor laser ray having an oscillation wavelength of 390 to 550 nm is used as the recording light. Preferred examples of the light source include a blue violet semiconductor laser having an oscillation wavelength of 390 to 415 nm, a blue green semiconductor laser having a center oscillation wavelength of 515 nm, and a blue violet SHG laser having a center oscillation wavelength of 425 nm resulting from halving the wavelength of an infrared semiconductor laser having a center oscillation wavelength 850 nm using an optical waveguide path element. Among these, a blue violet semiconductor and an SHG laser are preferred in view of the recording density. The thus-recorded information can be reproduced by irradiating a semiconductor laser ray from the substrate side or protective layer side while rotating the optical information recording medium at the same constant linear velocity as above, and detecting the reflected light.

The present invention is described in greater detail by referring to the following Examples, but the invention should not be construed as being limited thereto.

EXAMPLE 1

Compound (I-1) was dissolved in 2,2,3,3-tetrafluoropropanol to obtain a coating solution for the recording layer (concentration: 1% by mass). The obtained coating solution was coated on a polycarbonate substrate (diameter: 120 mm, thickness: 0.6 mm) by a spin coating method to form a recording layer (thickness (within the pregroove)): about 120 nm). Here, this polycarbonate substrate had on the surface thereof a spiral pregroove (track pitch: 0.6 μm, groove width: 0.3 μm, groove depth: 0.15 μm) formed by injection molding and the coating solution was coated on the surface in the pregroove side.

On the thus-formed recording layer, silver was sputtered to form a light-reflecting layer having a thickness of about 100 nm. Furthermore, on the light-reflecting layer, a UV-curable resin (SD318, produced by Dai-Nippon Ink & Chemicals, Inc.) was coated and cured by irradiating an ultraviolet ray thereon to form a protective layer having a thickness of 7 μm.

Through the foregoing steps, an optical disk according to the present invention was obtained.

Optical disks according to the present invention were obtained in the same manner except that Compound (I-1) was replaced by the compound shown in Table 2 (the amount used was not changed) in Example 1.

Optical disks for comparison were prepared in the same manner except that Compound (I-1) was replaced by Compound A, B, C, D, E, F or G shown below (the amount used was not changed) in Example 1.

Comparative Compound A (specific example (a) described in JP-A-11-53758):

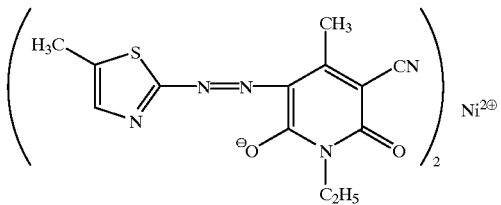

Comparative Compound B (specific example (b) described in JP-A-11-53758):

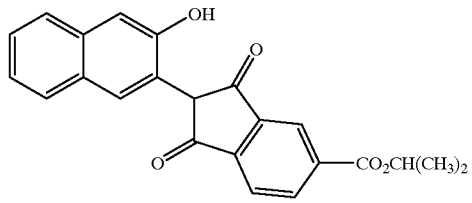

Comparative Compound C (specific example (c) described in JP-A-11-53758):

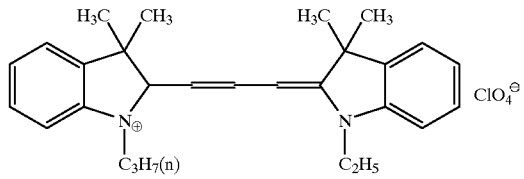

Comparative Compound D (specific example (f) described in JP-A-11-53758):

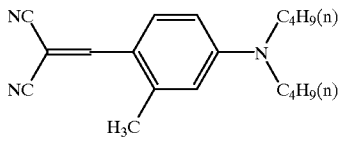

Comparative Compound E (compound described in Example 1 of JP-A-6-40161):

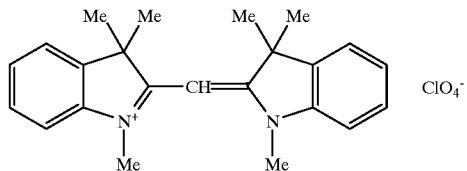

Comparative Compound F (compound described in Examples of JP-A-5-38878):

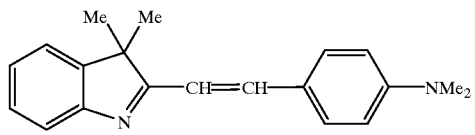

Comparative Compound G (specific examples 1–4 described in JP-A-2000-108513):

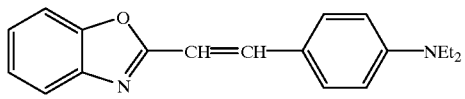

Evaluation as Optical Disk

On the thus-manufactured optical disk, 14T-EFM signals were recorded using a blue violet semiconductor laser having an oscillation wavelength of 408 nm at a linear velocity of 3.5 m/sec and thereafter, the recorded signals were reproduced. The modulation factor, groove reflectance and sensitivity were measured at an optimal power. The recording and the recording properties were evaluated using DDU1000 manufactured by Pulsteck. The evaluation results are shown in Table 2 below.

TABLE 2

| No. of Recording Medium | Compound Used in Recording Layer | Reflectance of Unrecorded Area (%) | Modulation Factor (recording power: 7 mW) (%) | Sensitivity (mW) |
| --- | --- | --- | --- | --- |
| 1 | (I-1) | 82 | 57 | 12 |
| 2 | (I-2) | 85 | 58 | 10 |
| 3 | (I-3) | 84 | 60 | 11 |
| 4 | (I-6) | 80 | 53 | 13 |
| 5 | (I-11) | 76 | 51 | 14 |
| 6 | (II-1) | 84 | 60 | 10 |
| 7 | (II-3) | 81 | 59 | 12 |
| 8 | (II-4) | 85 | 59 | 10 |
| 9 | (II-8) | 79 | 54 | 13 |
| 10 | (II-13) | 75 | 52 | 15 |
| 11 | (III-1) | 81 | 55 | 12 |
| 12 | (III-3) | 83 | 61 | 11 |
| 13 | (III-4) | 80 | 60 | 12 |
| 14 | (III-12) | 85 | 65 | 10 |
| 15 | (III-14) | 84 | 62 | 10 |
| Comparative Example 1 | A | 45 | 38 | 21 |
| Comparative Example 2 | B | 52 | 42 | 18 |
| Comparative Example 3 | C | 37 | 36 | 19 |
| Comparative Example 4 | D | 48 | 46 | 16 |
| Comparative Example 5 | E | 51 | 50 | 15 |
| Comparative Example 6 | F | 47 | 51 | 16 |
| Comparative Example 7 | G | 49 | 52 | 15 |

As seen from the results in Table 2, the optical disks (Examples 1 to 15) having a recording layer containing a compound as a characteristic feature of the present invention exhibit high reflectance, high modulation factor and high sensitivity to a short wavelength laser of the above-described semiconductor laser, as compared with the optical disks (Comparative Examples 1 to 7) having a recording layer containing Comparative Compound A, B, C, D, E, F or G. Therefore, it is verified that by using the dye compound according to the present invention, an optical disk having high recording properties to a short wavelength laser can be obtained.

By using a dye compound as a characteristic feature of the present invention, an optical information recording medium showing high reflectance, high modulation factor and high sensitivity to a short wavelength laser of 550 nm or less can be obtained. Accordingly, the information can be recorded at a higher density than in CD-R or DVD-R and an optical information recording medium capable of recording information of a further larger capacity can be provided.

While the present invention has been described in detail and with reference to specific examples thereof, it will be apparent to one skilled in the art that various changes and modifications can be made therein without departing from the spirit and scope thereof.

What is claimed is:

1. An optical information recording medium comprising a substrate having thereon a recording layer capable of information recording by laser irradiation, wherein said recording layer contains a dye compound represented by the following formula (I), (II) or (III):

wherein $R^{11}$, $R^{12}$ and $R^{13}$ each independently represents an alkyl group, an aryl group, an aralkyl group or a heterocyclic group, $L^{11}$, $L^{12}$ and $L^{13}$ each independently represents a methine group which may have a substituent, $(X^1)^{m-}$ represents an organic or inorganic m-valent anion, m represents an integer of 1 to 5, and any two of $R^{11}$, $R^{12}$, $R^{13}$, $L^{11}$, $L^{12}$ and $L^{13}$ may combine to form a ring;

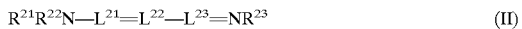

wherein $R^{21}$, $R^{22}$ and $R^{23}$ each independently represents an alkyl group, an aryl group, an aralkyl group or a heterocyclic group, $L^{21}$, $L^{22}$ and $L^{23}$ each independently represents a methine group which may have a substituent, and any two of $R^{21}$, $R^{22}$, $R^{23}$, $L^{21}$, $L^{22}$ and $L^{23}$ may combine to form a ring;

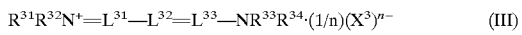

wherein $R^{31}$ and $R^{32}$ each independently represents an alkyl group, an aryl group, an aralkyl group or a heterocyclic group, $R^{33}$ and $R^{34}$ each independently represents an alkyl group, an aralkyl group or a heterocyclic group, $L^{31}$ and $L^{32}$ each independently represents a methine group which may have a substituent, $L^{33}$ represents an unsubstituted methine group, $(X^3)^{n-}$ represents an organic or inorganic n-valent anion, n represents an integer of 1 to 5, and any two of $R^{31}$, $R^{32}$, $R^{33}$, $R^{34}$, $L^{31}$, $L^{32}$ and $L^{33}$ may combine to form a ring.

2. The optical information recording medium according to claim 1, wherein $R^{11}$, $R^{12}$, $R^{13}$, $R^{21}$, $R^{22}$, $R^{23}$, $R^{31}$ and $R^{32}$ in formulae (I), (II) and (III) each independently represents an alkyl group having from 1 to 20 carbon atoms, which may have a substituent, an aryl group having from 6 to 18 carbon atoms, which may have a substituent, an aralkyl group having from 7 to 18 carbon atoms, which may have a substituent, or a 5- or 6-membered heterocyclic group which may have a substituent, and $R^{33}$ and $R^{34}$ in formula (III) each independently represents an alkyl group having from 1 to 20 carbon atoms, an aralkyl group having from 7 to 18 carbon atoms, or a 5- or 6-membered heterocyclic group.

3. The optical information recording medium according to claim 1, wherein $R^{11}$, $R^{21}$ and $R^{31}$ in formulae (I), (II) and (III) each is an aryl group or a heterocyclic group.

4. The optical information recording medium according to claim 1, wherein $R^{13}$ and $R^{23}$ in formulae (I) and (II) each is an aryl group or a heterocyclic group.

5. The optical information recording medium according to claim 1, wherein $R^{33}$ in formula (III) is an alkyl group.

6. The optical information recording medium according to claim 1, wherein the dye compound is a compound of formulae (I), (II) or (III) wherein a pair of $R^{11}$ and $L^{11}$, $R^{21}$ and $L^{21}$, or $R^{31}$ and $L^{31}$, respectively is combined to form a ring.

7. The optical information recording medium according to claim 1, wherein the dye compound is represented by the following formula (I-A), (II-A) or (III-A):

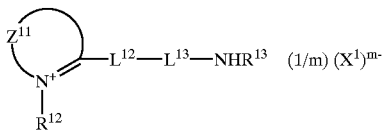  (I-A)

wherein $Z^{11}$ represents an atomic group necessary for forming a 5- or 6-membered nitrogen-containing heterocyclic ring which may have a substituent, $R^{12}$ and $R^{13}$ each independently represents an alkyl group, an aryl group, an aralkyl group or a heterocyclic group, $L^{12}$ and $L^{13}$ each independently represents a methine group which may have a substituent, $(X^1)^{m-}$ represents an organic or inorganic m-valent anion, and m represents an integer of 1 to 5;

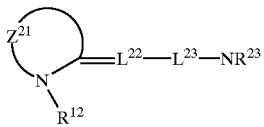  (II-A)

wherein $Z^{21}$ represents an atomic group necessary for forming a 5- or 6-membered nitrogen-containing heterocyclic ring which may have a substituent, $R^{22}$ and $R^{23}$ each independently represents an alkyl group, an aryl group, an aralkyl group or a heterocyclic group, and $L^{22}$ and $L^{23}$ each independently represents a methine group which may have a substituent;

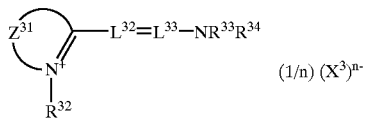  (III-A)

wherein $Z^{31}$ represents an atomic group necessary for forming a 5- or 6-membered nitrogen-containing heterocyclic ring which may have a substituent, $R^{32}$ represents an alkyl group, an aryl group, an aralkyl group or a heterocyclic group, $R^{33}$ and $R^{34}$ each independently represents an alkyl group, an aralkyl group or a heterocyclic group, $L^{32}$ represents a methine group which may have a substituent, $L^{33}$ represents an unsubstituted methine group, $(X^3)^{n-}$ represents an organic or inorganic n-valent anion, and n represents an integer of 1 to 5.

8. The optical information recording medium according to claim 1, wherein the dye compound is represented by the following formula (I-B), (II-B) or (III-B):

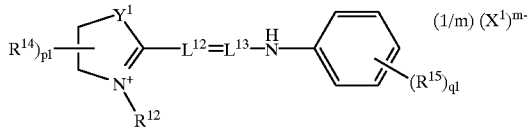  (I-B)

wherein $Y^1$ represents —O—, —S—, —Se—, —$NR^{16}$— or —$CR^{17}R^{18}$—, $R^{12}$ and $R^{16}$ each independently represents an alkyl group, an aryl group, an aralkyl group or a heterocyclic group, $R^{17}$ and $R^{18}$ each represents a hydrogen atom, an alkyl group, an aryl group, an aralkyl group or a heterocyclic group, $R^{14}$ represents a substituent on a carbon atom of the azole ring or a condensed ring, $R^{15}$ represents a substituent on the benzene ring, $L^{12}$ and $L^{13}$ each independently represents a methine group which may have a substituent, p1 represents an integer of 0 to 4, provided that when $p^1$ is an integer of 2 or more, the plurality of $R^{14}$s may be the same or different, q1 represents an integer of 0 to 5, provided that when q1 is an integer of 2 or more, the plurality of $R^{15}$s may be the same or different, $(X^1)^{m-}$ represents an organic or inorganic m-valent anion, and m represents an integer of 1 to 5;

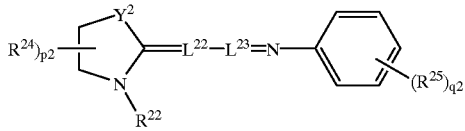  (II-B)

wherein $Y^2$ represents —O—, —S—, —Se—, —$NR^{26}$— or —$CR^{27}R^{28}$—, $R^{22}$ and $R^{26}$ each independently represents an alkyl group, an aryl group, an aralkyl group or a heterocyclic group, $R^{27}$ and $R^{28}$ each represents a hydrogen atom, an alkyl group, an aryl group, an aralkyl group or a heterocyclic group, $R^{24}$ represents a substituent on a carbon atom of the azole ring or a condensed ring, $R^{25}$ represents a substituent on the benzene ring, $L^{22}$ and $L^{23}$ each independently represents a methine group which may have a substituent, p2 represents an integer of 0 to 4, provided that when p2 is an integer of 2 or more, the plurality of $R^{24}$s may be the same or different, q2 represents an integer of 0 to 5, provided that when q2 is an integer of 2 or more, the plurality of $R^{25}$s may be the same or different;

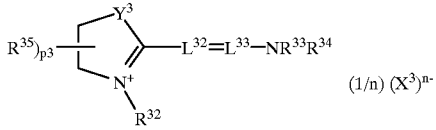  (III-B)

wherein $Y^3$ represents —O—, —S—, —Se—, —$NR^{36}$— or —$CR^{37}R^{38}$—, $R^{32}$ and $R^{36}$ each independently represents an alkyl group, an aryl group, an aralkyl group or a heterocyclic group, $R^{37}$ and $R^{38}$ each represents a hydrogen atom, an alkyl group, an aryl group, an aralkyl group or a heterocyclic group, $R^{35}$ represents a substituent on a carbon atom of the azole ring or a condensed ring, $L^{32}$ represents a methine group which may have a substituent, $L^{33}$ represents an unsubstituted methine group, p3 represents an integer of 0 to 4, provided that when p3 is an integer of 2 or more, the plurality of $R^{35}$s may be the same or different, $R^{33}$ and $R^{34}$ each independently represents an alkyl group, an aralkyl group or a heterocyclic group, $(X^3)^{n-}$ represents an organic or inorganic n-valent anion, and n represents an integer of 1 to 5.

9. The optical information recording medium according to claim 1, wherein the substrate is a transparent disk-like substrate having on a surface thereof a pregroove with a track pitch of 0.2 to 0.8 μm, and the recording layer is provided on the pregroove-having surface of the substrate.

10. The optical information recording medium according to claim 1, further comprising a light-reflecting layer which comprises a metal and is provided on the recording layer.

11. The optical information medium according to claim 1, further comprising a protective layer provided above the recording layer.

12. A method for recording information, comprising irradiating a laser at a wavelength of 550 nm or less on an optical information recording medium according to claim 1 to record information.

* * * * *